E. HERMANN.
UNIVERSAL JOINT.
APPLICATION FILED DEC. 11, 1912.

1,072,612.

Patented Sept. 9, 1913.

2 SHEETS—SHEET 1.

WITNESSES
S. Constine
Harry L. Totten

INVENTOR
Emanuel Hermann
BY
Wm. F. Booth
ATTORNEY

E. HERMANN.
UNIVERSAL JOINT.
APPLICATION FILED DEC. 11, 1912.

1,072,612.

Patented Sept. 9, 1913.

2 SHEETS—SHEET 2.

WITNESSES
S. Constine
Harry A. Totten

INVENTOR
Emanuel Hermann
BY
Wm F. Booth
ATTORNEY

UNITED STATES PATENT OFFICE.

EMANUEL HERMANN, OF SAN FRANCISCO, CALIFORNIA.

UNIVERSAL JOINT.

1,072,612.

Specification of Letters Patent.

Patented Sept. 9, 1913.

Application filed December 11, 1912. Serial No. 736,089.

*To all whom it may concern:*

Be it known that I, EMANUEL HERMANN, a subject of the Emperor of Austria-Hungary, residing in the city and county of San Francisco and State of California, have invented certain new and useful Improvements in Universal Joints, of which the following is a specification.

My invention relates to that class of universal joints for shafting in which interfitting ball ends of the driving and driven shafts are connected for rotary motion by pivots in two planes at right angles.

My invention has for its object the provision of a simple and effective universal joint of this type, which is compact, strong and durable, and to this end my invention consists in the novel joint and in the construction, arrangement and combination of parts, which I shall now fully describe by reference to the accompanying drawings in which—

Figure 1:
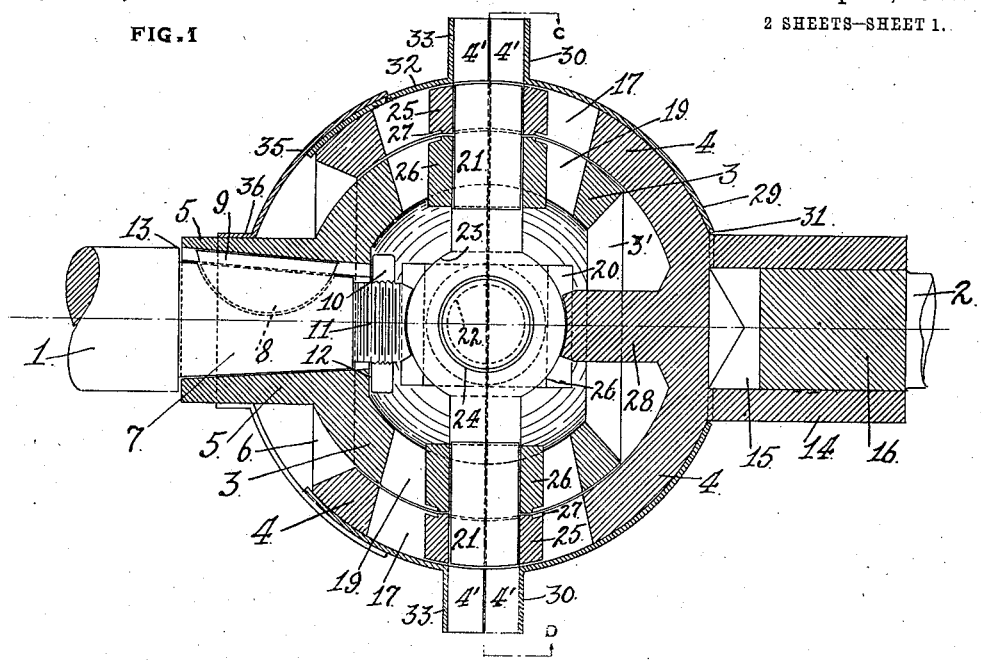
Figure 2:
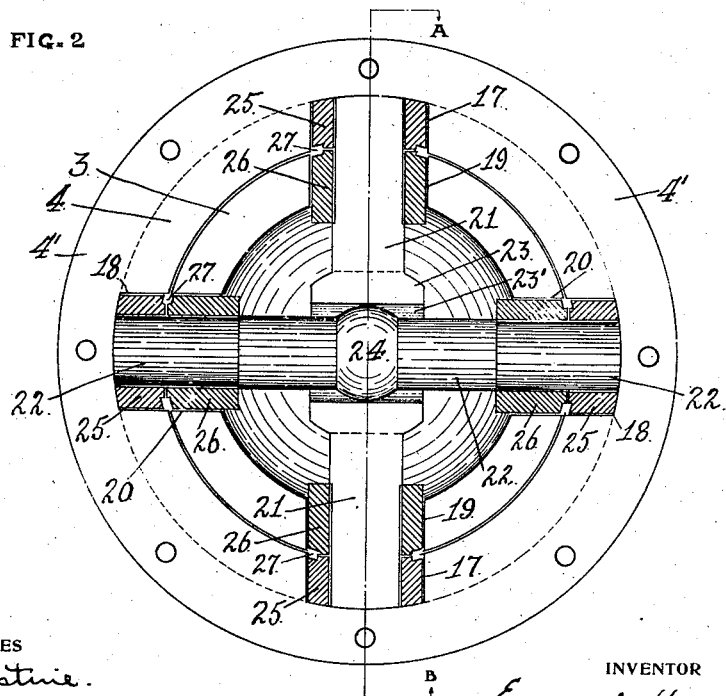
Figure 3:
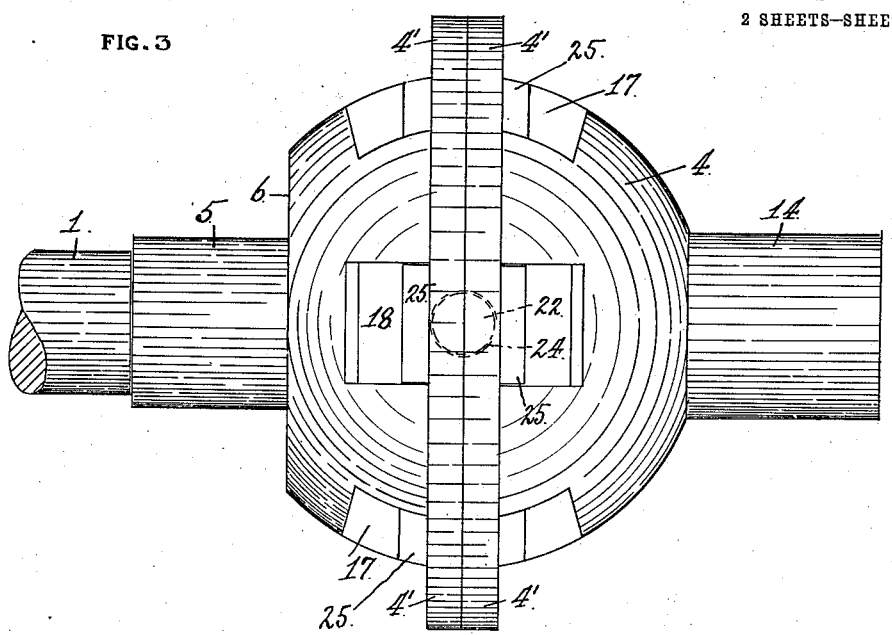
Figure 4:
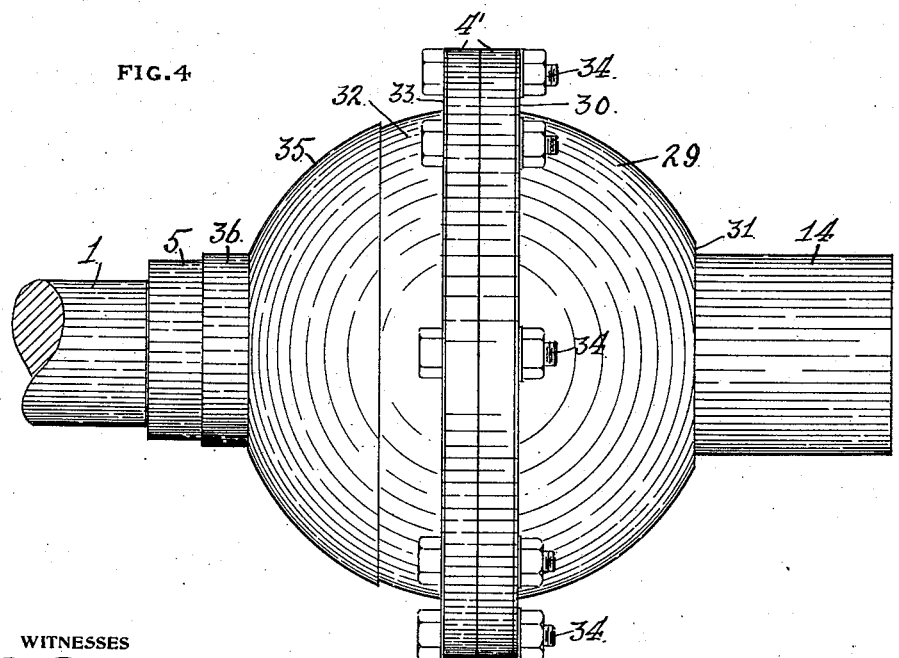

Figure 1 is a section of the joint in the line of the shaft axis, being on the line A—B of Fig. 2. Fig. 2 is a section of the joint at right angles to Fig. 1 on the line C—D thereof. Fig. 3 is an elevation of the joint with its housing-shell removed. Fig. 4 is an elevation of the joint in full.

Referring first to Fig. 1, the driving shaft is 1 and the driven shaft is 2. 3 is an inner ball and 4 is an outer ball, the two balls interfitting for universal movement. The inner ball 3 is carried by the driving shaft and the outer ball 4 by the driven shaft. The inner ball is mounted upon and made fast to its shaft by means, as follows. Said ball 3 is formed with a sleeve 5 which projects through and has free play in an opening 6 in the side of the outer ball 4. The sleeve 5 fits upon a reduced portion 7 of the shaft 1, and is locked thereon for rotation by a key 8 fitted in the shaft and seated in a key-way 9 in the sleeve. The lock against end motion is effected by a nut 10 screwed upon a reduced end 11 of the shaft 1, said nut being set up against a shoulder 12 on the inner surface of the ball 3, thus locking the parts linearly in one direction. In the other direction they are locked by the outer shoulder 13 of the reduced portion 7 of the shaft bearing against the outer end of the sleeve 5. The driven shaft 2 is connected with the outer ball 4 by means of a sleeve 14 of said ball, said sleeve having a square bore 15 in which the square end 16 of said shaft is slidably fitted, thus providing not only for the rotation of said shaft on its axis, but also its necessary longitudinal play when such is required, as is usual in the shafting of automobiles, for example. Now in order to provide for a driving connection of the two balls without impairing their universality of movement there is the following construction. Through the wall of the outer ball 4 at equidistant intervals of 90 degrees in a circumferential series the plane of which is perpendicular to the axis of rotation are made four slots, one opposing pair being here designated by 17 and the other pair by 18. These slots are elongated in the line of the axis of the shaft 2 as clearly shown in Figs. 1 and 3. Through the wall of the inner ball 3 are made similar elongated slots 19 and 20 similarly located and corresponding to the slots 17 and 18 respectively in the outer ball.

Referring now, for greater clearness, to Fig. 2, 21 and 22 are two cross pins, one at right angles to the other. The pin 21 has at its middle a rounded-surface hub 23 with a through passage 23', the diameter of which is sufficiently greater than that of the other pin 22 which passes through it to enable said latter to rock therein on a curved-surface bearing 24 with which said pin 22 is provided, said rocking movement being thus universal and limited only by the necessities of its use in practice. The trunnion ends of the pin 21 pass into the slots 17 and 19 of the outer and inner balls respectively, and the trunnion-ends of the pin 22 pass into the slots 18 and 20 of said balls respectively. Squared trunnion-blocks 25 are fitted upon the trunnion-ends of both pins in the slots of the outer ball; and similar blocks 26 are fitted upon said pin-ends in the slots of the inner ball. These blocks slide freely in the length of the slots, but fit closely the width of the slots and thereby connect the two balls for rotary-motion transmission. It will be seen that the blocks 25 and 26 are separate and independent blocks, which construction is necessary in that owing to the varied angularity of the two shafts the corresponding slots of their balls will not always be parallel, but will be in various angular relations. It will also be seen that at the meeting faces of the two blocks, they are cut away circumferentially, as shown at 27. This will avoid any possibility of one block crossing into and locking its end in the other slot. The outer ball 4 is made in hemispherical sections with meeting flanges 4'.

In order to afford proper bearing for the cross pins at their middle, the reduced end 11 of the drive shaft 1 bears on the hub 23 of the pin 21 on one side and on the other side of said hub bears a flange 28 formed with the outer ball 4, said flange extending inward through the open side 3' of the inner ball 3.

To cover the joint, I provide a typical housing-shell as follows:—Referring to Figs. 1 and 4, 29 is an approximately-hemispherical shell section having a flange 30 at its rim and hole 31 in its side. This shell section fits over one-half the joint lying close upon the outer ball, the sleeve 14 of said ball extending through the hole 31 in the side of the section. Another shell section 32, a spherical segment, as seen in Fig. 1, is fitted over the other side of the outer ball and is provided with a flange 33. The two shell sections 29 and 32 are secured together by bolts 34 through their meeting flanges, said bolts also securing the flanges 4' of the halves of the outer ball. 35 is a third shell-section which overlaps and spherically telescopes the shell section 32, said section 35 having a side sleeve 36 which fits over the sleeve 5 of the inner ball 3.

It will now be seen that owing to the essential universality of the ball and socket feature of the joint, movement may be had at all angles, and owing to the arrangement of the pins 21 and 22 with relation to each other and to the balls, universal movement is not impaired, while at the same time said pins serve as the means for the transmission of rotary motion from one shaft to the other.

I claim:— .

1. A universal joint for shafting comprising a ball on the driving shaft; a ball on the driven shaft, the two balls interfitting for universal movement; a pair of cross pins at right angles having at their crossing a rocking bearing; and bearings between each ball and the pins adapted for locking the balls for rotative movement about their axes while permitting relative angular movement.

2. A universal joint for shafting comprising a ball on the driving shaft; a ball on the driven shaft, the two balls interfitting for universal movement, said balls having at equidistant intervals in a circumferential series whose plane is perpendicular to the axes of rotation four corresponding slots elongated in the line of said axis; a pair of cross pins at right angles, having at their crossing a rocking bearing; and bearings on the ends of the pins fitting and having play in the length of the slots of the balls to provide for angular relative movement of said balls, said bearings fitting closely the width of said slots to provide for locking the balls together for rotative movement.

3. A universal joint for shafting comprising a ball on the driving shaft; a ball on the driven shaft, the two balls interfitting for universal movement, said balls having at equidistant intervals in a circumferential series whose plane is perpendicular to the axis of rotation four corresponding slots elongated in the line of said axis; a pair of cross pins at right angles having at their crossing a rocking bearing, the ends of said pins passing into the corresponding slots of both balls; and independent trunnion-blocks fitted to each end of each pin, one block lying in the slot of one ball and another in the slot of the other ball, said blocks having play in the length of the slots to provide for angular relative movement of the balls, and fitting closely the width of the slots to lock the balls together for rotative movement.

4. A universal joint for shafting consisting of a driving shaft; a driven shaft; an inner ball secured to the end of the driving shaft; an outer ball secured to the end of the driven shaft, the two shaft balls interfitting for universal movement, and said balls having at equidistant intervals in a circumferential series perpendicular to the plane of the axis of rotation four corresponding slots elongated in the line of said axis; a pair of cross pins at right angles having at their crossing a rocking bearing, the ends of said pins passing into the corresponding slots of both balls; means for steadying said crossing bearing of the pins comprising an inwardly projecting end of the drive shaft in contact with said crossing bearing on one side, and an inwardly projecting flange of the outer ball in contact with said crossing bearing on the other side; and independent trunnion-blocks fitted to each end of each pin, one block lying in the slot of one ball and another in the slot of the other ball, said blocks having play in the length of the slots to provide for angular relative movement of the balls, and fitting closely the width of the slots to lock the balls together for rotative movement.

In testimony whereof I have signed my name to this specification in the presence of two subscribing witnesses.

EMANUEL HERMANN.

Witnesses:
  Wm. F. Booth,
  D. B. Richards.